United States Patent
Mao

(10) Patent No.: US 11,190,766 B2
(45) Date of Patent: Nov. 30, 2021

(54) METHOD AND APPARATUS FOR DETERMINING DIVISION OF CODING UNIT, COMPUTING DEVICE, AND READABLE STORAGE MEDIUM

(71) Applicant: TENCENT TECHNOLOGY (SHENZHEN) COMPANY LIMITED, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 340 days.

(21) Appl. No.: 16/390,165

(22) Filed: Apr. 22, 2019

(65) Prior Publication Data
US 2019/0253709 A1   Aug. 15, 2019

Related U.S. Application Data

(63) Continuation of application No. PCT/CN2018/090935, filed on Jun. 13, 2018.

(30) Foreign Application Priority Data

Dec. 14, 2017 (CN) .......................... 201711339827.5

(51) Int. Cl.
*H04N 19/119* (2014.01)
*H04N 19/176* (2014.01)
(Continued)

(52) U.S. Cl.
CPC .......... *H04N 19/119* (2014.11); *H04N 19/105* (2014.11); *H04N 19/11* (2014.11);
(Continued)

(58) Field of Classification Search
CPC .... H04N 19/105; H04N 19/11; H04N 19/119; H04N 19/122; H04N 19/14; H04N 19/176; H04N 19/593
See application file for complete search history.

(56) References Cited

U.S. PATENT DOCUMENTS

| | | | |
|---|---|---|---|
| 2010/0172583 A1 | 7/2010 | Shimauchi et al. | |
| 2014/0140395 A1 | 5/2014 | Kim | |
| 2015/0055698 A1 | 2/2015 | Na et al. | |

FOREIGN PATENT DOCUMENTS

| | | | |
|---|---|---|---|
| CN | 104363450 A | * | 2/2015 |
| CN | 104363450 A | | 2/2015 |

(Continued)

OTHER PUBLICATIONS

CN105391999A Machine Translation (Year: 2016).*
(Continued)

*Primary Examiner* — William C Vaughn, Jr.
*Assistant Examiner* — Naod W Belai
(74) *Attorney, Agent, or Firm* — Anova Law Group, PLLC

(57) ABSTRACT

A method and apparatus for determining division of a coding unit, a and a readable storage medium are provided. The method includes: determining whether a size of a current coding unit is greater than a size of a smallest coding unit; obtaining a gradient of the current coding unit when the size of the current coding unit is greater than the size of the smallest coding unit; determining to divide the current coding unit when the gradient of the current coding unit is not less than a first threshold; and when the gradient of the current coding unit is less than a first threshold, obtaining gradients of sub-coding units included in the current coding unit; and determining, according to the gradients of the sub-coding units, whether to divide the current coding unit.

15 Claims, 8 Drawing Sheets

(51) Int. Cl.
*H04N 19/105* (2014.01)
*H04N 19/14* (2014.01)
*H04N 19/11* (2014.01)
*H04N 19/122* (2014.01)

(52) U.S. Cl.
CPC .......... *H04N 19/122* (2014.11); *H04N 19/14* (2014.11); *H04N 19/176* (2014.11)

(56) References Cited

FOREIGN PATENT DOCUMENTS

| CN | 105391999 A | * | 3/2016 |
| CN | 105391999 A |  | 3/2016 |
| CN | 105491385 A |  | 4/2016 |
| KR | 20150021822 A |  | 3/2015 |
| WO | 2017142262 A1 |  | 8/2017 |

OTHER PUBLICATIONS

CN104363450B Machine Translation (Year: 2017).*
The World Intellectual Property Organization (WIPO) International Search Report for PCT/CN2018/090935 dated Sep. 10, 2018 6 Pages (including translation).
The European Patent Office (EPO) The Extended European Search Report for 18887236.0 dated Sep. 28, 2020 9 Pages.
Korean Intellectual Property Office (KIPO) Office Action 1 for 20197036795 dated Apr. 8, 2021 19 Pages (including translation).
Belghith Fatma et al.; "Fast coding unit partitioning method based on edge detection for HEVC intra-coding," Signal, Image and Video Processing, Springer London, London, vol. 10, No. 5, Sep. 25, 2015 (Sep. 25, 2015), pp. 811-818. 8 pages.

* cited by examiner

METHOD AND APPARATUS FOR DETERMINING DIVISION OF CODING UNIT, COMPUTING DEVICE, AND READABLE STORAGE MEDIUM

RELATED APPLICATIONS

This application is a continuation application of PCT Patent Application No. PCT/CN2018/090935, filed on Jun. 13, 2018, which claims priority to Chinese Patent Application No. 201711339827.5, entitled "METHOD AND APPARATUS FOR DETERMINING DIVISION OF CODING UNIT, TERMINAL DEVICE, AND READABLE STORAGE MEDIUM" filed on Dec. 14, 2017, the entire contents of both of which are incorporated herein by reference.

FIELD OF TECHNOLOGY

This application relates to the field of video coding technologies, and in particular, to a method and apparatus for determining division of a coding unit, a computing device, and a readable storage medium.

BACKGROUND OF THE DISCLOSURE

Currently, resolutions of videos become increasingly higher with the development of the Internet and hardware devices. In 2013, a new generation of video coding standard, that is, the High Efficiency Video Coding (HEVC) standard is researched and made by a video coding cooperative team that is jointly formed by the ITU Video Coding Experts Group (VCEG) and the ISO Moving Picture Experts Group (MPEG). Compared with the H.264/AVC, the HEVC saves more than a half of rate bits on a premise that visual quality is similar. A main reason that the HEVC has higher compression performance is that the HEVC provides a larger code block structure and a flexible sub-block division manner. In the HEVC, a largest coding unit (Largest Coding Unit) can be divided into small coding units (CU) recursively, to form a coding unit tree (CTU) structure.

However, because each coding unit whose size is greater than a size of a smallest coding unit needs to be further divided when the coding unit structure is used, and a prediction mode of a sub-coding unit obtained after the division is selected, an operation load is very heavy and an operation complexity degree is high in this division manner.

SUMMARY

This application is mainly to provide a method and an apparatus for determining division of a coding unit, a computing device, and a readable storage medium, to resolve a technical problem in the existing technology that an operation load is heavy and an operation complexity degree is high in a coding unit division manner.

To achieve the foregoing objective, a first aspect of this application provides a method for determining division of a coding unit. The method includes determining, by a computing device, whether a size of a current coding unit is greater than a size of a smallest coding unit; obtaining, by the computing device, a gradient of the current coding unit when the size of the current coding unit is greater than the size of the smallest coding unit; and determining to divide the current coding unit when the gradient of the current coding unit is not less than a first threshold. The method also includes: when the gradient of the current coding unit is less than a first threshold, obtaining gradients of sub-coding units included in the current coding unit; and determining, according to the gradients of the sub-coding units, whether to divide the current coding unit.

To achieve the foregoing objective, a second aspect of this application provides an apparatus for determining division of a coding unit, including a memory and a processor coupled to the memory. The processor is configured to: determine whether a size of a current coding unit is greater than a size of a smallest coding unit; obtain a gradient of the current coding unit when the size of the current coding unit is greater than the size of the smallest coding unit; and determine to divide the current coding unit when the gradient of the current coding unit is not less than a first threshold. The processor is also configured to: when the gradient of the current coding unit is less than a first threshold, obtain gradients of sub-coding units comprised in the current coding unit; and determine, according to the gradients of the sub-coding units, whether to divide the current coding unit.

To achieve the foregoing objective, a third aspect of this application provides a computing device, including a memory, a processor, and a computer program stored in the memory and run on the processor, the computer program, when being executed by the processor, implementing the steps of the method for determining division of a coding unit according to the first aspect of this application.

To achieve the foregoing objective, a fourth aspect of this application provides a non-transitory computer-readable storage medium storing computer program instructions. The computer program instructions are executable by at least one processor to perform: determining whether a size of a current coding unit is greater than a size of a smallest coding unit; obtaining a gradient of the current coding unit when the size of the current coding unit is greater than the size of the smallest coding unit; and determining to divide the current coding unit when the gradient of the current coding unit is not less than a first threshold. The computer program instructions further cause the at least one processor to perform: when the gradient of the current coding unit is less than a first threshold, obtaining gradients of sub-coding units included in the current coding unit; and determining, according to the gradients of the sub-coding units, whether to divide the current coding unit.

This application provides a method for determining division of a coding unit, including: determining, by a computing device, whether a size of a current coding unit is greater than a size of a smallest coding unit; obtaining a gradient of the current coding unit when the size of the current coding unit is greater than the size of the smallest coding unit; obtaining gradients of sub-coding units included in the current coding unit, when the gradient of the current coding unit is less than a first threshold; and determining, according to the gradients of the sub-coding units, whether to divide the current coding unit. Compared with the existing technology, whether to further divide the current coding unit whose size is greater than the size of the smallest coding unit can be determined according to the gradient of the current coding unit and/or the gradients of the sub-coding units included in the current coding unit, so that a coding unit that does not need to be divided can be determined, thereby reducing an operation amount caused by the coding unit division and reducing an operation complexity degree.

BRIEF DESCRIPTION OF THE DRAWINGS

To describe the technical solutions of the embodiments of this application or the existing technology more clearly, the following briefly describes the accompanying drawings required for describing the embodiments or the existing technology. Apparently, the accompanying drawings in the following description show only some embodiments of this application, and persons skilled in the art may still derive other drawings from these accompanying drawings without creative efforts.

DESCRIPTION OF EMBODIMENTS

To make the invention objectives, features, and advantages of this application clearer and more comprehensible, the following clearly and completely describes the technical solutions in the embodiments of this application with reference to the accompanying drawings in the embodiments of this application. Apparently, the embodiments described are merely a part rather than all of the embodiments of this application. All other embodiments obtained by persons skilled in the art based on the embodiments of this application without creative efforts shall fall within the protection scope of this application.

In the existing technology, there is a technical problem in a coding unit division manner that an operation load is heavy and an operation complexity degree is high. To resolve the foregoing problem, this application provides a method for determining division of a coding unit. Compared with the existing technology, whether to further divide a current coding unit whose size is greater than a size of a smallest coding unit needs to be determined according to a gradient of the current coding unit and gradients of sub-coding units included in the current coding unit, so that a coding unit that does not need to be divided can be determined, thereby reducing an operation amount caused by the coding unit division and reducing an operation complexity degree.

Figure 1:
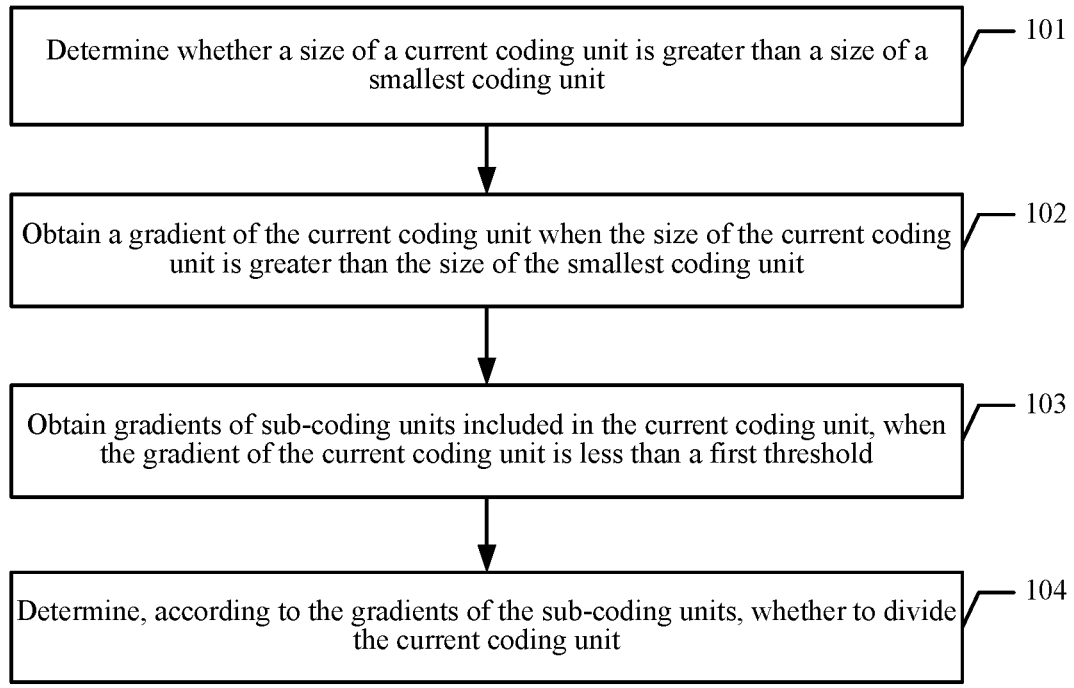
FIG. 1 is a schematic flowchart of a method for determining division of a coding unit according to an embodiment of this application.

FIG. 1 is a schematic flowchart of a method for determining division of a coding unit according to an embodiment of this application. The method includes the following steps:

Step 101. Determine whether a size of a current coding unit is greater than a size of a smallest coding unit.

In the HEVC, a concept of a macroblock (MB) is extended, and the macroblock may be a coding unit, a prediction unit (PU), and a transform unit (TU). The coding unit is a basic unit of coding in the HEVC, and a frame of video image is divided into a plurality of largest coding units. Compared with a fixed size of a 16×16 macroblock in the H.264/AVC, in a definition of main levels in the HEVC, a size of a largest coding unit is 64×64, and the largest coding unit can further be recursively divided into smaller coding units; and a size of a smallest coding unit is 8×8, and other sizes of coding units may be 32×32 and 16×16. It can be learned that the HEVC provides a more flexible coding unit dividing manner and a larger coding unit. This helps adapt to coding properties of different texture areas.

The foregoing method for determining division of a coding unit is implemented by an apparatus for determining division of a coding unit (briefly referred to as determining apparatus below). The determining apparatus may be a program module stored in a memory and is invoked and executed by a processor from the memory, and a computing device to which the determining apparatus belongs may be a server.

It should be noted that the method for determining division of a coding unit in one embodiment of this application is applicable to intra-frame prediction (e.g., for a P-frame or a B-frame). The intra-frame prediction is a coding technology that eliminates space domain redundancy by using a spatial correlation between pixels in a video frame. There are as much as 35 intra-frame prediction modes provided in the HEVC, including 33 directional prediction mode and two non-directional prediction modes. The non-directional prediction modes are a mode 0 (a DC mode) and a mode 1 (a plane mode), and the 33 directional prediction modes are modes 2 to 35. In the intra-frame prediction coding process, whether the current coding unit needs to be divided can be effectively determined by using the method for determining division of a coding unit in one embodiment of this application.

Preferentially, the foregoing method for determining division of a coding unit may be applied to the intra-frame prediction coding process. After an optimal intra-frame prediction mode of the current coding unit and a coding cost value corresponding to the optimal intra-frame prediction mode are determined, whether the current coding unit needs to be further divided is determined by using the foregoing method. Details are as follows:

The determining apparatus determines whether the size of the current coding unit is greater than the size of the smallest coding unit, the size of the smallest coding unit being, for example, 8×8. In addition, when the size of the current coding unit is equal to the size of the smallest coding unit, it indicates that the current coding unit is the smallest coding unit and cannot be further divided (e.g., the division determination process ends). When the size of the current coding unit is greater than the size of the smallest coding unit, it indicates that whether the current coding unit needs to be further divided needs to be further determined.

The coding cost value is a quantity of bits that are needed to complete coding in a specific intra-frame prediction mode. Therefore, different intra-frame prediction modes have different coding cost values.

Step 102. Obtain a gradient of the current coding unit when the size of the current coding unit is greater than the size of the smallest coding unit. In some embodiments, step 102 may be performed after determining the coding cost value corresponding to the optimal intra-frame prediction mode and after determining that the size of the current coding unit is greater than the size of the smallest coding unit. When the gradient of the current coding unit is not less than a first threshold, it may be directly determined to divide the current coding unit. The first threshold may be a gradient value threshold associated with the gradient of the current coding unit.

Step 103. Obtain gradients of sub-coding units included in the current coding unit, when the gradient of the current coding unit is less than a first threshold. In other words, when the gradient of the current coding unit is less than a first threshold, additional step needs to be performed to determine whether to divide the current coding unit.

Step 104. Determine, according to the gradients of the sub-coding units, whether to divide the current coding unit.

In one embodiment of this application, the determining apparatus obtains the gradient of the current coding unit when the size of the current coding unit is greater than the size of the smallest coding unit.

A larger gradient of the current coding unit indicates less smooth image content of the current coding unit and a larger possibility of division. A smaller gradient of the current coding unit indicates more smooth content of the current coding unit and a smaller possibility of division. Therefore, when the size of the current coding unit is greater than the size of the smallest coding unit, the gradient of the current coding unit is compared with the first threshold, to initially determine whether division needs to be performed. When the gradient of the current coding unit is less than the first threshold, the gradients of the sub-coding units included in the current coding unit are obtained, to further determine whether division needs to be performed. When the gradient of the current coding unit is greater than or equal to the first threshold, it is determined that the current coding unit needs to be divided.

The first threshold may be preset or may be calculated. This is described in detail in subsequent embodiments.

Figure 1A:
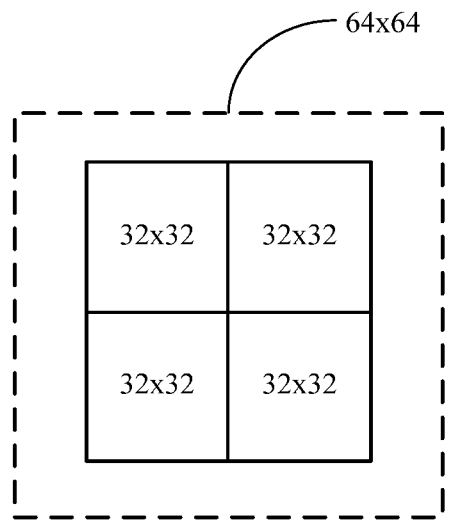
FIG. 1a is a schematic diagram of sub-coding units of a current 64×64 coding unit according to an embodiment of this application.

It should be noted that the current coding unit is not actually divided in step 103, and the foregoing sub-coding unit is merely a unit that is assumed based on the size of the current coding unit. A quantity of the sub-coding units is 4. For example, when the size of the current coding unit is 64×64, it can indicate that the current coding unit is possible to be divided into four 32×32 sub-coding units. However, the current coding unit is not actually divided in this case. FIG. 1a is a schematic diagram of sub-coding units of a current 64×64 coding unit according to an embodiment of this application. Four 32×32 blocks are the sub-coding units. In another example, if the size of the current coding unit is 32×32, it is possible to divide the current coding unit into four 16×16 sub-coding units.

A gradient is a directional derivative of brightness values of pixels obtained along a direction such as horizontal, vertical, left-below, and right-below. A gradient of a sub-coding unit may be calculated by using an existing gradient algorithm, for example, may be calculated by using a Sobel algorithm, or may be calculated by using another method. Other method may include: calculating a sum of horizontal one dimensional gradients and vertical one dimensional gradients of all or some pixel points in a sub-coding unit, and using the sum as the gradient of the sub-coding unit; or calculating a sum of gradients along multiple directions of all or some pixel points in a sub-coding unit, and using the sum as the gradient of the sub-coding unit.

The determining apparatus determines, according to the gradients of the sub-coding units, whether to divide the current coding unit. It may be understood that, in the existing technology, current coding units whose sizes are greater than sizes of smallest coding units are all divided. However, in one embodiment of this application, when a gradient of a current coding unit is less than a first threshold, whether to divide the current coding unit can further be determined according to the gradients of the sub-coding units. If it is determined that a current coding unit needs to be divided, the current coding unit is divided. If it is determined that a current coding unit does not need to be divided, the current coding unit is not divided. Therefore, there are necessarily some current coding units that do not need to be divided, so that an operation amount and an operation complexity degree of the coding unit division can be effectively reduced. For example, in the existing technology, for coding units whose sizes are greater than the sizes of the smallest coding unit, if a quantity of such type of coding units is 100, a quantity of times of performing division is 100. However, in one embodiment of this application, for coding units whose sizes are greater than the sizes of the smallest coding unit, if a quantity of such type of coding units is 100, it is determined, according to gradients of sub-coding units included in the coding units, that 60 of the coding units need to be divided, and 40 do not need to be divided, and therefore division needs to be performed for only 60 times, and an operation amount caused by the coding unit division can be reduced and an operation complexity degree is reduced as the quantity of times of division is reduced.

In one embodiment of this application, it is determined whether a size of a current coding unit is greater than a size of a smallest coding unit; a gradient of the current coding unit is obtained when the size of the current coding unit is greater than the size of the smallest coding unit; gradients of sub-coding units that are included in the current coding unit are obtained when the gradient of the current coding unit is less than a first threshold; and it is determined, according to the gradients of the sub-coding units, whether to divide the current coding unit. Compared with the existing technology, whether to further divide a current coding unit whose size is greater than a size of a smallest coding unit needs to be determined according to a gradient of the current coding unit and gradients of sub-coding units included in the current coding unit, so that a coding unit that does not need to be divided can be determined, thereby reducing an operation amount caused by the coding unit division and reducing an operation complexity degree.

Figure 2:
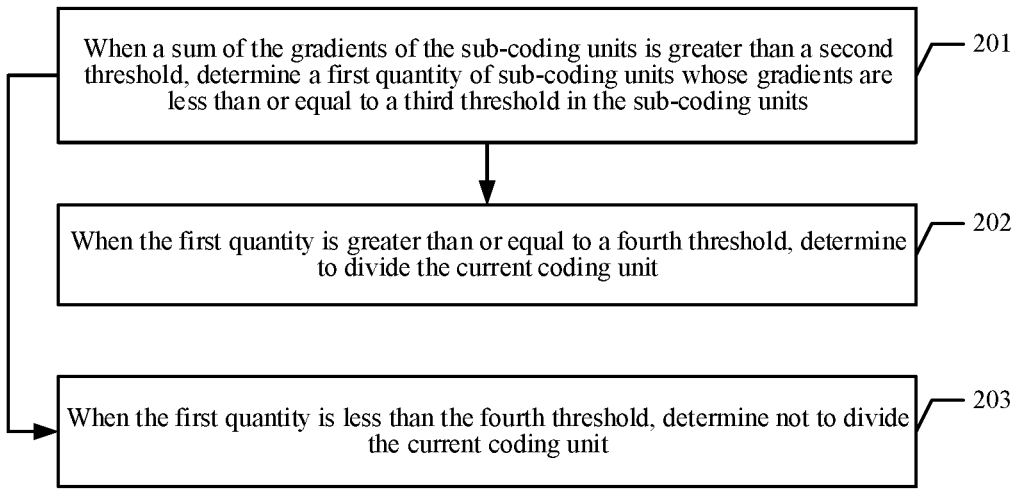
FIG. 2 is a schematic flowchart of detailed steps of step 104 in the embodiment shown in FIG. 1.

In one embodiment of this application, there are a plurality of manners for determining, according to the gradients of the sub-coding units, whether to divide the current coding unit. For example, whether to divide the current coding unit is determined based on a comparison between the sum of the gradients of the sub-coding units and the first threshold. When the sum of the gradients of the sub-coding units is greater than the first threshold, it is directly determined that the current coding unit needs to be divided. When the sum of the gradients of the sub-coding units is not greater than the first threshold, further determination step such as step 201 or step 301 may be performed to evaluate whether the current coding unit needs to be divided. Two of the manners are described below. For one of the manners, refer to FIG. 2. FIG. 2 is a schematic flowchart of detailed steps of step 104 in the embodiment shown in FIG. 1. Step 104 may include:

Step 201. When a sum of the gradients of the sub-coding units is greater than a second threshold, determine a first quantity of sub-coding units whose gradients are less than or equal to a third threshold in the sub-coding units; and perform step 202 or step 203. The second threshold may be a gradient value threshold associated with the sum of the gradients of the sub-coding units. The third threshold may be gradient value threshold associated with the gradient of an individual sub-coding unit. Whether to perform step 202 or step 203 may be determined based on a comparison between the first quantity and a fourth threshold. The fourth threshold may be a quantity threshold associated with a number of sub-coding units.

Step 202. When the first quantity is greater than or equal to a fourth threshold, determine to divide the current coding unit.

Step 203. When the first quantity is less than the fourth threshold, determine not to divide the current coding unit.

In one embodiment of this application, a first threshold and second threshold are set, and the first threshold being greater than or equal to the second threshold. The first threshold is used to be compared with the gradient of the current coding unit, and when the gradient of the current coding unit is less than the first threshold, a sum of the gradients of the sub-coding units included in the current coding unit are compared with the second threshold, to determine whether the current coding unit needs to be divided. In some embodiments, for the same coding unit, the gradient of the coding unit is equal to the sum of the gradients of the sub-coding units of the coding unit.

When the gradient of the current coding unit is less than the first threshold, and the sum of the gradients of the sub-coding units is greater than the second threshold, the determining apparatus determines a first quantity of the sub-coding units whose gradients are less than or equal to the third threshold in the sub-coding units.

Further, in one embodiment of this application, when the sum of the gradients of the sub-coding units is less than or equal to the second threshold, it may be determined that the current coding unit does not need to be divided in this case.

It should be noted that a smaller sum of the gradients of the sub-coding units indicates image more smooth content of the current coding unit, and a smaller possibility of further dividing the current coding unit; and a larger sum of the gradients of the sub-coding units indicates less smooth image content of the current coding unit, and a larger possibility of further dividing the current coding unit. Therefore, in one embodiment of this application, by setting the first threshold and the second threshold, there may be three cases of determining whether division needs to be performed. One case is that the gradient of the current coding unit is greater than or equal to the first threshold, and it indicates that image content of the current coding unit is not smooth. In this case, it is determined that the current coding unit needs to be divided. Another case is that the sum of the gradients of the sub-coding units is less than the second threshold, and it indicates that image content of the current coding unit is smooth. In this case, it is determined not to divide the current coding unit. A last case it that the gradient of the current coding unit is less than the first threshold, and the sum of the gradients of the sub-coding units is greater than the second threshold. In this case, the first threshold and the second threshold are set considering there may be a relatively large difference between the sub-coding units, and therefore whether the current coding unit needs to be divided is further determined based on the foregoing first quantity.

It may be understood that, considering that a quantity of sub-coding units is usually four, the fourth threshold may be set to 1, 2, or 3, and is preferentially 1. When a sum of gradients of the four sub-coding units is less than the first threshold and is greater than the second threshold, and when the first quantity is greater than or equal to the fourth threshold, it indicates that there are sub-coding units whose gradient difference is relatively large, and it indicates that image content of the current coding unit is not evenly smoothed, that is, some areas are smooth and some areas are not smooth. To reduce bit rates, it is determined that the current coding unit needs to be divided. When the first quantity is less than the fourth threshold, it indicates that the sub-coding units whose gradient difference is relatively large do not exist, and therefore it is determined that the current coding unit does not need to be divided.

The foregoing third threshold may be a relatively small value, for example, the value approaches to zero or is equal to zero.

It should be noted that the sum of the gradients of the sub-coding units needs to meet the following condition: being less than the first threshold and being greater than the second threshold. Only when the condition is met can it is determined, based on the first quantity, whether the current coding unit needs to be further divided. When the condition is met, the first quantity of sub-coding units whose gradients are less than or equal to the third threshold cannot be four (where when the first quantity is 4, it indicates that gradients of the four sub-coding units are all very small, and actually the coding unit does not need to be divided in this case, and a sum of the gradients of the four sub-coding units is greater than the first threshold), and therefore the current coding unit will not be divided due to wrong determining.

In one embodiment of this application, when the gradient of the current coding unit is less than the first threshold, and the sum of the gradients of the sub-coding units is greater than the second threshold, whether the current coding unit needs to be divided is further determined according to the gradients of the sub-coding units of the current coding unit. This not only can reduce an operation load and an operation complexity degree of the coding unit division, but also fully considers an impact of a difference of the gradients of the sub-coding units on a structure of the coding unit and on selection of an optimal intra-frame prediction mode (because after the current coding unit is divided into the plurality of sub-coding units, optimal intra-frame prediction modes of the sub-coding units may be different, or may be different to the optimal intra-frame prediction mode of the current coding unit), so that coding can be better implemented, thereby further reducing bit rates.

Figure 3:
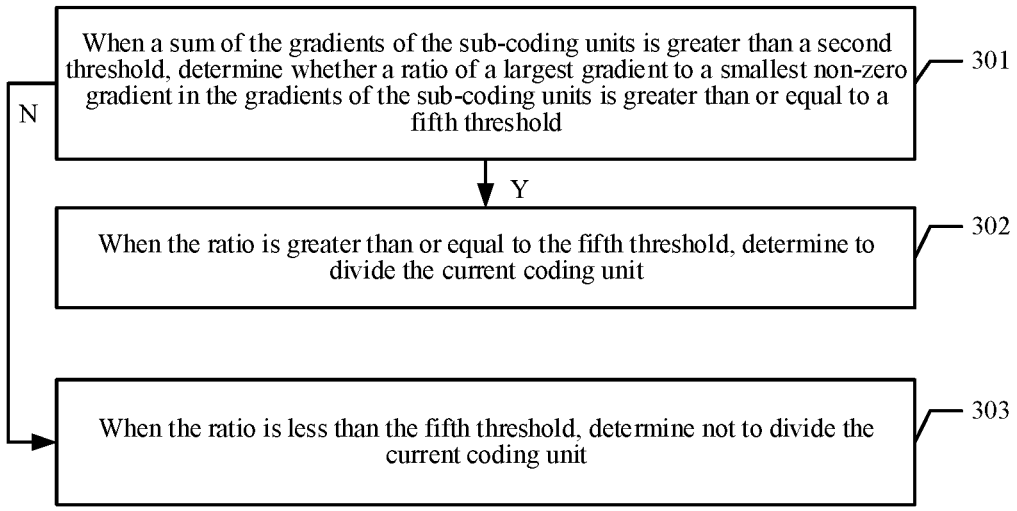
FIG. 3 is a schematic flowchart of detailed steps of step 104 in the embodiment shown in FIG. 1.

For the other manner of determining, according to the gradients of the sub-coding units, whether to divide the current coding unit, refer to FIG. 3. FIG. 3 is a schematic flowchart of detailed steps of step 104 in the embodiment shown in FIG. 1. Step 104 may include:

Step 301. When a sum of the gradients of the sub-coding units is greater than a second threshold, determine whether a ratio of a largest gradient to a smallest non-zero gradient in the gradients of the sub-coding units is greater than or equal to a fifth threshold; and perform step 302 or step 303.

That is, whether to perform step 302 or step 303 may be determined based on a comparison between the ratio and a fifth threshold.

Step 302. When the ratio is greater than or equal to the fifth threshold, determine to divide the current coding unit.

Step 303. When the ratio is less than the fifth threshold, determine not to divide the current coding unit.

In one embodiment of this application, when the gradient of the current coding unit is less than the first threshold and the gradients of the sub-coding units are greater than the second threshold, whether there are sub-coding units whose gradient difference is relatively large may further be determined in another manner, to determine whether the current coding unit needs to be further divided. Details are as follows: The determining apparatus determines whether a ratio of a largest gradient to a smallest non-zero gradient in the gradients of the sub-coding units is greater than or equal to the fifth threshold. When the ratio is greater than or equal to the fifth threshold, it indicates that a gradient difference between a sub-coding unit of the largest gradient to a sub-coding unit of the smallest non-zero gradient is relatively large. To reduce bit rates, it is determined that the current coding unit needs to be divided. When the ratio is less than the fifth threshold, it indicates that the gradient difference between the sub-coding unit of the largest gradient to the sub-coding unit of the smallest non-zero gradient is small, and it is determined that the current coding unit does not need to be divided.

In one embodiment of this application, when the gradient of the current coding unit is less than the first threshold, and the sum of the gradients of the sub-coding units is greater than the second threshold, whether the current coding unit needs to be divided is further determined according to the gradients of the sub-coding units of the current coding unit. This not only can reduce an operation load and an operation complexity degree of the coding unit division, but also fully considers an impact of a difference of the gradients of the sub-coding units on a structure of the coding unit and on selection of an intra-frame prediction mode, so that coding can be better implemented, thereby further reducing bit rates.

Figure 4:
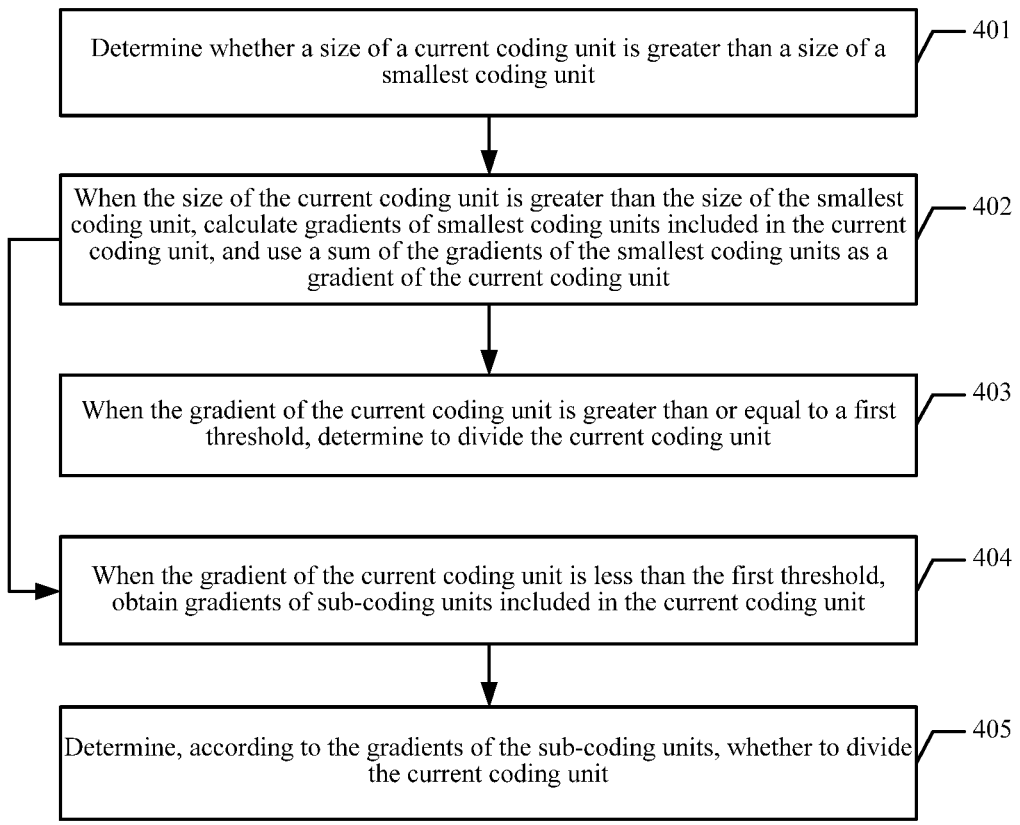
FIG. 4 is another schematic flowchart of a method for determining division of a coding unit according to an embodiment of this application.

Based on the embodiment shown in FIG. 1, refer to FIG. 4. FIG. 4 is another schematic flowchart of a method for determining division of a coding unit according to an embodiment of this application. The method includes:

Step 401. Determine whether a size of a current coding unit is greater than a size of a smallest coding unit.

Step 402. When the size of the current coding unit is greater than the size of the smallest coding unit, calculate gradients of smallest coding units included in the current coding unit, and use a sum of the gradients of the smallest coding units as a gradient of the current coding unit; and perform step 403 or step 404.

Step 403. When the gradient of the current coding unit is greater than or equal to a first threshold, determine to divide the current coding unit.

Step 404. When the gradient of the current coding unit is less than the first threshold, obtain gradients of sub-coding units included in the current coding unit.

Step 405. Determine, according to the gradients of the sub-coding units, whether to divide the current coding unit.

It should be noted that step 401 is similar to the content described in step 101 in the embodiment shown in FIG. 1. This is not described herein again. In addition, for step 405, refer to the content of the detailed steps in FIG. 2 and FIG. 3 for step 104 in FIG. 1. This is not described herein again.

In one embodiment of this application, when it is determined that the size of the current coding unit is greater than the size of the smallest coding unit, the determining apparatus calculates the gradients of the smallest coding units included in the current coding unit, and uses the sum of the gradients of the smallest coding units as the gradient of the current coding unit. For example, the size of the current coding unit is 16×16 and includes four 8×8 smallest coding units, the gradient of the current coding unit is a+b+c+d if gradients of the four smallest coding units are respectively a, b, c, and d.

Further, the determining apparatus determines whether the gradient of the current coding unit is greater than or equal to the first threshold; and when the gradient of the current coding unit is greater than or equal to the first threshold, determines that the current coding unit needs to be divided; or when the gradient of the current coding unit is less than the first threshold, the determining apparatus further determines, according to the gradients of the sub-coding units of the current coding unit, whether the current coding unit needs to be divided.

It may be understood that, in one embodiment of this application, whether the current coding unit needs to be divided is first determined according to the gradient of the current coding unit. When it is initially determined that the current coding unit does not need to be divided, to further improve the accuracy of determining of division, whether the current coding unit needs to be divided is determined again according to the gradients of the sub-coding units. This not only can reduce an operation load and a complexity degree, but also can implement more proper division.

Figure 5:
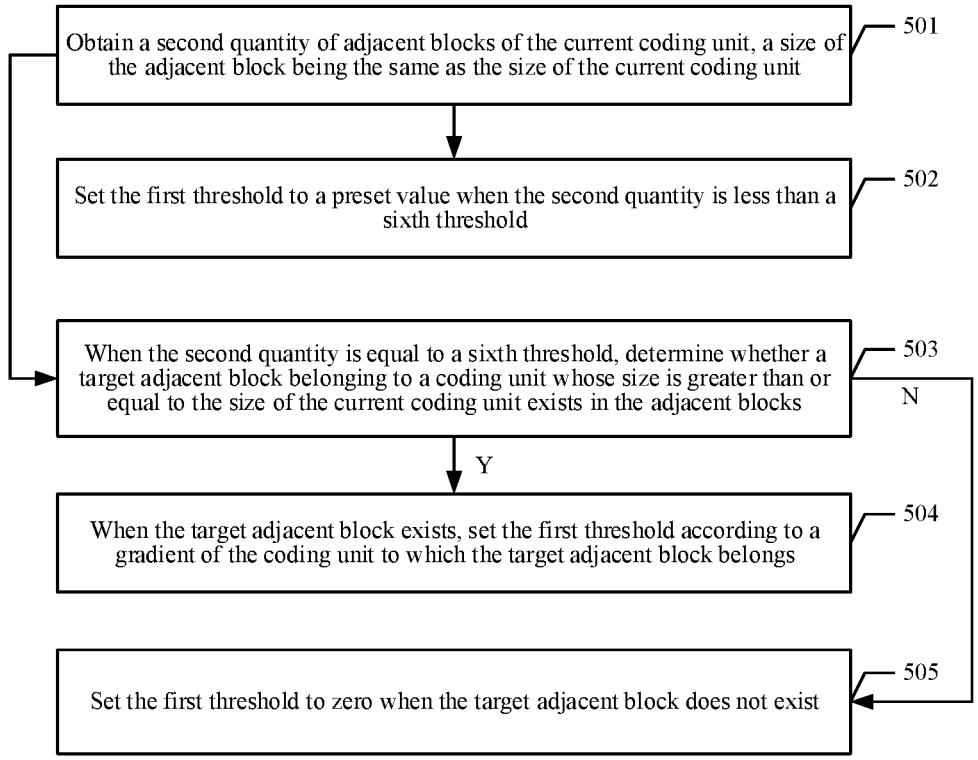
FIG. 5 is a schematic flowchart of a method for setting a first threshold according to an embodiment of this application.

It should be noted that the foregoing first threshold may be related to an adjacent block of the current coding unit. FIG. 5 is a schematic flowchart of a method for setting a first threshold according to an embodiment of this application. The method includes the following steps:

Step 501. Obtain a second quantity of adjacent blocks of the current coding unit, a size of each adjacent block being the same as the size of the current coding unit. For example, four adjacent blocks of the current coding unit may be used to determine the first threshold. The second quantity is four. The adjacent blocks may be blocks located at the left, above-left, above, and above-right of the current coding unit. It can be understood that other quantity of adjacent blocks and/or blocks having other adjacent location relationships with the current coding unit may be used.

After the foregoing second quantity is obtained, a first threshold is set according to the second quantity. Specifically, step 502 or step 503 is performed.

Step 502. Set the first threshold to a preset value when the second quantity is less than a sixth threshold. For example, the sixth threshold may be four. When the current coding unit is located at an upper right corner of the frame, there is no adjacent blocks existing above the current coding unit, only the left adjacent block exists. The second quantity is one, which is less than the sixth threshold.

Step 503. When the second quantity is equal to a sixth threshold, determine whether a target adjacent block belonging to a coding unit whose size is greater than or equal to the size of the current coding unit exists in the adjacent blocks.

Step 504. When the target adjacent block exists, set the first threshold according to a gradient of the coding unit to which the target adjacent block belongs.

Step 505. Set the first threshold to zero when the target adjacent block does not exist.

Setting of the first threshold may be determined before using of the first threshold, that is, the first threshold is set before whether the gradient of the current coding unit is greater than or equal to the first threshold is determined. In addition, for different current coding units, first thresholds corresponding to the current coding units are all determined.

Figure 6:
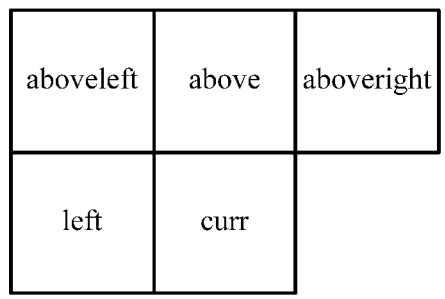
FIG. 6 is a schematic diagram of adjacent blocks of a current coding unit according to an embodiment of this application.

Adjacent blocks of a current coding unit are a block on the left-above, a block on the above, a block on the right-above, and a block on the left of the current coding unit. FIG. 6 is a schematic diagram of adjacent blocks of a current coding unit according to an embodiment of this application. curr represents a current coding unit, aboveleft represents a block on the left-above, above represents a block on the above, aboveright represents a block on the right-above, and left represents a block on the left.

A size of an adjacent block of the current coding unit is the same as a size of the current coding unit. For example, if the size of the current coding unit is 32×32, the adjacent block is determined around the current coding unit based on the size of 32×32. It should be noted that the adjacent block may be a coding unit, or may be a plurality of coding units, or may further belong to a part of a coding unit. For example, if the size of the current coding unit is 32×32, a block on the left-above of the current coding unit belongs to a 64×64 coding unit, a block on the above of the current coding unit is four 16×16 coding units, and a block on the right-above is a 32×32 coding unit.

It may be understood that, for some current coding units, four adjacent blocks may be determined for the current coding units. For some current coding units, due to special locations at which the current coding units are located, a quantity of determined adjacent blocks may be less than four, and therefore, a second quantity of adjacent blocks of a current coding unit are obtained first.

Further, whether the second quantity is less than a sixth threshold is determined. For example, the value may be 4, and if 4 is less than the sixth threshold, the first threshold is set to a preset value. The preset value is a fixed threshold. It may be understood that, when the first threshold is the preset value, the second threshold may be another preset value, and the first threshold is kept being greater than the second threshold.

When the second quantity is equal to the sixth threshold, the first threshold is set according to a size of a coding unit to which an adjacent block belongs and the size of the current coding unit. Details are as follows: The determining apparatus determines a size of a coding unit to which adjacent blocks belongs, and determines whether a target adjacent block belonging to the coding unit and whose size is greater than or equal to the size of the current coding unit exists in the adjacent blocks; when the target adjacent block exists, sets the foregoing first threshold based on a gradient of the coding unit to which the target adjacent block belongs. For example, if a size of a current coding unit P is 32×32, a left-above block of the current coding unit P belongs to a part of a 64×64 coding unit A, an above block of the current coding unit P is four 16×16 coding units B, a right-above block of the current coding unit P is a 32×32 coding unit C, and a left block of the current coding unit P is 16 8×8 coding units D. Therefore, a size of the coding unit A is greater than the size of the current coding unit P, a size of the coding unit C is equal to the size of the coding unit P, and the foregoing first threshold is set based on a gradient of the coding unit A and a gradient of the coding unit C. For example, an average value of the gradient of the coding unit A and the gradient of the coding unit C is calculated, and a product of the average value and a preset coefficient is used as the foregoing first threshold and the foregoing first threshold is set. In addition, after the first threshold is set in this manner, a difference between the first threshold and a preset interval value can be calculated. If the difference is greater than zero, the difference is used as the second threshold. If the difference is less than zero, the second threshold is set to zero.

When there is no target adjacent block exists, the first threshold is set to zero. In this case, the second threshold is also set to zero.

It should be noted that the first threshold is used to be compared with the gradient of the current coding unit. When the first threshold is set based on the adjacent block, a target adjacent block belonging to a coding unit whose size is greater than or equal to the current coding unit needs to be determined first, and then the first threshold is set based on an average value of the gradient of the coding unit to which the target adjacent block belongs. The first threshold is used to represent a maximum value of a gradient of a coding unit that does not need to be divided. Therefore, when a target adjacent block exists, it indicates that the coding unit that has a larger size around the current coding unit exists and is not further divided. On a premise that the coding unit having a larger size is not divided, there is a possibility that the current coding unit does not need to be further divided. Therefore, when the gradient of the current coding unit is greater than or equal to the first threshold, it indicates that the gradient of the current coding unit is greater than or equal to a maximum value of the current coding unit that the current coding unit does not need to be divided, and it may be directly determined that the current coding unit needs to be further divided. When the gradient of the current coding unit is less than the first threshold, it can be determined that there is a relatively high probability that the current coding unit does not need to be further divided. Therefore, the first threshold is set based on the gradient of the coding unit to which the target adjacent block belongs, so that the accuracy of determining whether to divide the current coding unit can be effectively improved. In addition, when the target adjacent block does not exist, it indicates that coding units that are around the current coding unit are all coding units whose sizes are less than the size of the current coding unit. In this case, to ensure the accuracy of determining whether to perform division, the first threshold is set to zero, so that the gradient of the current coding unit is necessarily greater than or equal to the first threshold (zero), and the current coding unit necessarily needs to be divided.

In one embodiment of this application, whether the current coding unit needs to be divided is determined with reference to the gradient of the current coding unit and the gradients of the sub-coding units of the current coding unit. This not only can reduce an operation load and an operation complexity degree of the coding unit division, but also fully considers an impact of a difference of the gradients of the sub-coding units on a structure of the coding unit and on selection of an intra-frame prediction mode, so that coding can be better implemented, thereby further reducing bit rates. In addition, by setting the first threshold based on the adjacent block of the current coding unit, to determine, according to the first threshold and the gradient of the current coding unit, whether the current coding unit needs to be divided, the accuracy of the determining can be effectively improved, so that the current coding unit can be divided more properly.

Figure 7:
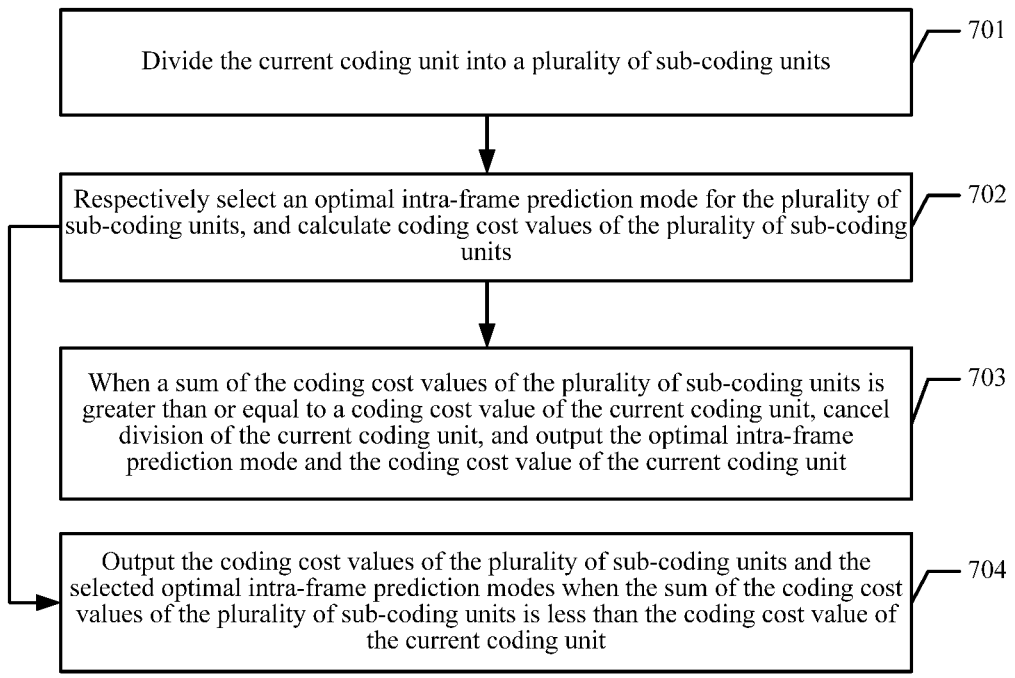
FIG. 7 is a schematic flowchart of dividing a current coding unit according to an embodiment of this application.

In one embodiment of this application, when it is determined that the current coding unit does not need to be divided, an optimal intra-frame prediction mode of the current coding unit is output, to code the current coding unit by using the optimal intra-frame prediction mode; and when the current coding unit needs to be divided, a division operation is performed. FIG. 7 is a schematic flowchart of dividing a current coding unit according to an embodiment of this application. The method shown in FIG. 7 includes:

Step 701. Divide the current coding unit into a plurality of sub-coding units.

Step 702. Respectively select an optimal intra-frame prediction mode for the plurality of sub-coding units, and calculate coding cost values of the plurality of sub-coding units; and perform step 703 or step 704.

Step 703. When a sum of the coding cost values of the plurality of sub-coding units is greater than or equal to a coding cost value of the current coding unit, cancel division of the current coding unit, and output the optimal intra-frame prediction mode and the coding cost value of the current coding unit.

Step 704. Output the coding cost values of the plurality of sub-coding units and the selected optimal intra-frame prediction modes when the sum of the coding cost values of the plurality of sub-coding units is less than the coding cost value of the current coding unit.

It may be understood that, the content described in the embodiment shown in FIG. 7 can be applied to FIG. 2, FIG. 3, and FIG. 4 (e.g., after determining that division needs to be performed for the current coding unit).

In one embodiment of this application, when it is determined that the current coding unit needs to be divided, the determining apparatus divides the current coding unit into a plurality of sub-coding units. For example, a coding unit whose size is 64×64 can be divided into four 32×32 sub-coding units.

Further, optimal intra-frame prediction modes are respectively selected for the sub-coding units, and coding cost values corresponding to the optimal intra-frame prediction modes are calculated. There are a plurality manners for selecting the optimal intra-frame prediction modes of the sub-coding units and calculating the coding cost values during actual applications. For example, coding cost values of sub-coding units in all intra-frame prediction modes are respectively calculated, and a prediction mode in which a coding cost value is the minimum is used as the optimal intra-frame prediction mode of the sub-coding unit, that is, an optimal prediction mode (e.g., intra-frame prediction mode) of the sub-coding unit is a prediction mode in which coding costs are the lowest in a plurality of prediction modes. During actual application, a method for selecting an optimal intra-frame prediction mode can be selected based on a specific need. This is not described herein.

The sum of the coding cost values of the plurality of sub-coding units is calculated. When the sum is greater than or equal to the coding cost value of the current coding unit, it indicates that costs required for coding the current coding unit are less than costs required for coding the sub-coding units of the current coding unit, and therefore division of the current coding unit is canceled and the optimal intra-frame prediction mode of the current coding unit is output, so that the current coding unit can be coded based on an optimal prediction mode. It should be noted that the coding cost value of the current coding unit is also calculated in the process of selecting the optimal intra-frame prediction mode of the current coding unit.

When the sum of the coding cost values of sub-coding units is less than the coding cost value of the current coding unit, it indicates that the division herein can reduce the coding costs, and the coding cost values of the plurality of sub-coding units and the corresponding optimal intra-frame prediction modes are output.

It may be understood that, in one embodiment of this application, when the coding cost values of the plurality of sub-coding units after the division are less than the cost values of the current coding unit, it indicates that the division performed on the current coding unit is proper. In this case, the optimal intra-frame prediction mode and the coding cost value of current coding unit are discarded. Instead, the sub-coding units are traversed, and it is determined whether a size of a traversed sub-coding unit is greater than the size of the smallest coding unit. When the size of the traversed sub-coding unit is greater than the size of the smallest coding unit, the traversed sub-coding unit is used as the foregoing current coding unit, and step 101 in the embodiment shown in FIG. 1 is still performed. When the size of the traversed sub-coding unit is equal to the size of the smallest coding unit, it indicates that the current coding unit does not need to be further divided, and the sub-coding units can be coded by using the optimal intra-frame prediction modes of the sub-coding units, to implement coding of the current coding unit. When the coding cost value of the sub-coding unit after the division is greater than or equal to coding cost value of the current coding unit, it indicates that the division performed on the current coding unit is improper. In this case, division of the current coding unit is canceled, and the current coding unit is coded by still using the optimal intra-frame prediction mode of the current coding unit. In the foregoing manner, an optimal unit structure and an optimal intra-frame prediction mode can be obtained through division, thereby effectively reducing bit rates.

In one embodiment of this application, when it is determined that the current coding unit needs to be divided, a sum of coding cost values of sub-coding units of a current coding unit obtained after the division is compared with the coding cost value of the current coding unit, and the sum is output in a manner in which a coding cost value is the minimum, so that the coding unit can be more properly divided, thereby reducing coding costs.

Figure 8:
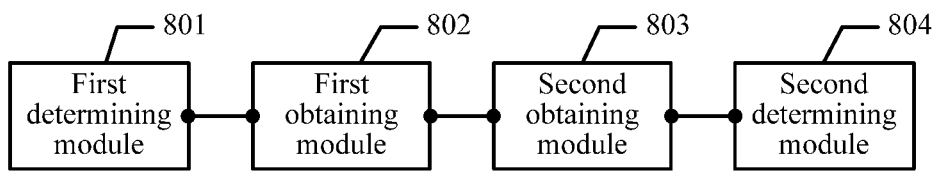
FIG. 8 is a schematic structural diagram of a program module of an apparatus for determining division of a coding unit according to an embodiment of this application.

FIG. 8 is a schematic structural diagram of a program module of an apparatus for determining division of a coding unit according to an embodiment of this application. The apparatus includes:

a first determining module 801, configured to determine whether a size of a current coding unit is greater than a size of a smallest coding unit;

a first obtaining module 802, configured to obtain a gradient of the current coding unit when the size of the current coding unit is greater than the size of the smallest coding unit;

a second obtaining module 803, configured to: obtain gradients of sub-coding units included in the current coding unit, when the gradient of the current coding unit is less than a first threshold; and a second determining module 804, configured to determine, according to the gradients of the sub-coding units, whether to divide the current coding unit.

In the HEVC, a concept of a macroblock (MB) is extended, and the macroblock includes a coding unit, a prediction unit (PU), and a transform unit (TU). The coding unit is a basic unit of coding in the HEVC, and a frame of video image is divided into a plurality of largest coding units. Compared with a fixed size of a 16×16 macroblock in the H.264/AVC, in a definition of main levels in the HEVC, a size of a largest coding unit is 64×64, and the largest coding unit can further be recursively divided into smaller coding units; and a size of a smallest coding unit is 8×8, and other sizes of coding units may be 32×32 and 16×16. It can be learned that the HEVC provides a more flexible coding unit dividing manner and a larger coding unit. This helps adapt to coding properties of different texture areas.

It should be noted that the apparatus for determining division of a coding unit in one embodiment of this application is applicable to intra-frame prediction. The intra-frame prediction is a coding technology that eliminates space domain redundancy by using a spatial correlation between pixels in a video frame. There are as much as 35 intra-frame prediction modes provided in the HEVC, including 33 directional prediction mode and two non-directional prediction modes. The non-directional prediction modes are a mode 0 (a DC mode) and a mode 1 (a plane mode), and the 33 directional prediction modes are modes 2 to 35.

In one embodiment of this application, an optimal intra-frame prediction mode needs to be selected for the current coding unit, and coding costs of the current coding unit are calculated. To confirm whether the current coding unit can be further divided, the determining apparatus determines whether the size of the current coding unit is greater than the size of the smallest coding unit, the size of the smallest coding unit being 8×8. In addition, when the size of the current coding unit is equal to the size of the smallest coding unit, it indicates that the current coding unit is the smallest coding unit and cannot be further divided. When the size of the current coding unit is greater than the size of the smallest coding unit, it indicates that whether the current coding unit needs to be further divided needs to be further determined.

It should be noted that a gradient of a sub-coding unit may be calculated by using an existing gradient algorithm, for example, may be calculated by using a Sobel algorithm, or may be calculated by using another method such as calculating a sum of horizontal one dimensional gradients and vertical one dimensional gradients of all or some pixel points in a sub-coding unit or calculating a sum of multi-gradients of all or some pixel points in a sub-coding unit.

In one embodiment of this application, it is determined whether a size of a current coding unit is greater than a size of a smallest coding unit; a gradient of the current coding unit is obtained when the size of the current coding unit is greater than the size of the smallest coding unit; gradients of sub-coding units that are included in the current coding unit are obtained when the gradient of the current coding unit is less than a first threshold; and it is determined, according to the gradients of the sub-coding units, whether to divide the current coding unit. Compared with the existing technology, whether to further divide a current coding unit whose size is greater than a size of a smallest coding unit needs to be determined according to a gradient of the current coding unit and gradients of sub-coding units included in the current coding unit, so that a coding unit that does not need to be divided can be determined, thereby reducing an operation amount caused by the coding unit division and reducing an operation complexity degree.

Figure 9:
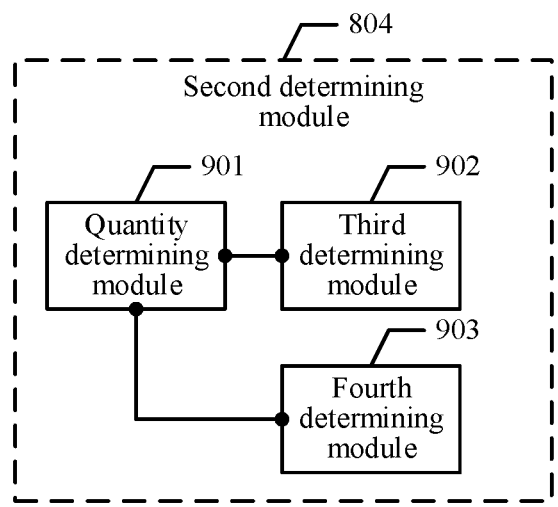
FIG. 9 is a schematic structural diagram of a detailed program module of a second determining module in the embodiment shown in FIG. 8.

FIG. 9 is a schematic structural diagram of a detailed program module of the second determining module 804 in the embodiment shown in FIG. 8 according to an embodiment of this application. The second determining module 804 includes:

a quantity determining module 901, configured to: when a sum of the gradients of the sub-coding units is greater than a second threshold, determine a first quantity of sub-coding units whose gradients are less than or equal to a third threshold in the sub-coding units, the first threshold being greater than the second threshold;

a third determining module 902, configured to: when the first quantity is greater than or equal to a fourth threshold, determine to divide the current coding unit; and a fourth determining module 903, configured to: when the first quantity is less than the fourth threshold, determine not to divide the current coding unit.

It may be understood that, for content related to the foregoing modules, specifically refer to the embodiment shown in FIG. 2. This is not described herein again.

In one embodiment of this application, whether the current coding unit needs to be divided is further determined according to the gradients of the sub-coding units of the current coding unit. This not only can reduce an operation load and an operation complexity degree of the coding unit division, but also fully considers an impact of a difference of the gradients of the sub-coding units on a structure of the coding unit and on selection of an intra-frame prediction mode, so that coding can be better implemented, thereby further reducing bit rates.

Figure 10:
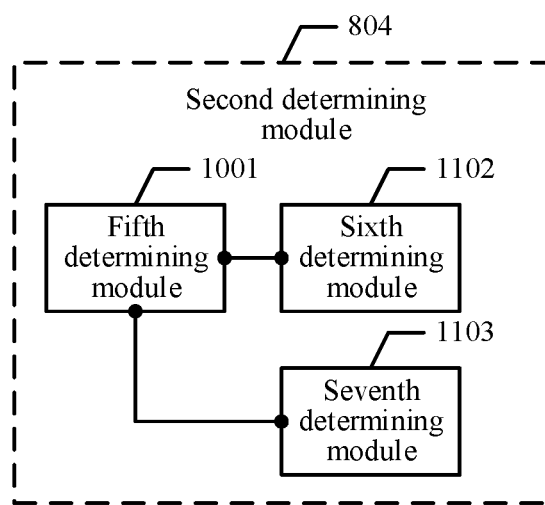
FIG. 10 is a structural diagram of a detailed program module of a second determining module in the embodiment shown in FIG. 8.

FIG. 10 is a schematic structural diagram of a detailed program module of the second determining module 804 in the embodiment shown in FIG. 8 according to an embodiment of this application. The second determining module 804 includes:

a fifth determining module 1001, configured to: when a sum of the gradients of the sub-coding units is greater than a second threshold, determine whether a ratio of a largest gradient to a smallest non-zero gradient in the gradients of the sub-coding units is greater than or equal to a fifth threshold;

a sixth determining module 1002, configured to: when the ratio is greater than or equal to a fifth threshold, determine to divide the current coding unit; and a seventh determining module 1003, configured to: when the ratio is less than the fifth threshold, determine not to divide the current coding unit.

It may be understood that, for content related to the foregoing modules, specifically refer to FIG. 3. This is not described herein again.

In one embodiment of this application, whether the current coding unit needs to be divided is further determined according to the gradients of the sub-coding units of the current coding unit. This not only can reduce an operation load and an operation complexity degree of the coding unit division, but also fully considers an impact of a difference of the gradients of the sub-coding units on a structure of the coding unit and on selection of an intra-frame prediction mode, so that coding can be better implemented, thereby further reducing bit rates.

Figure 11:
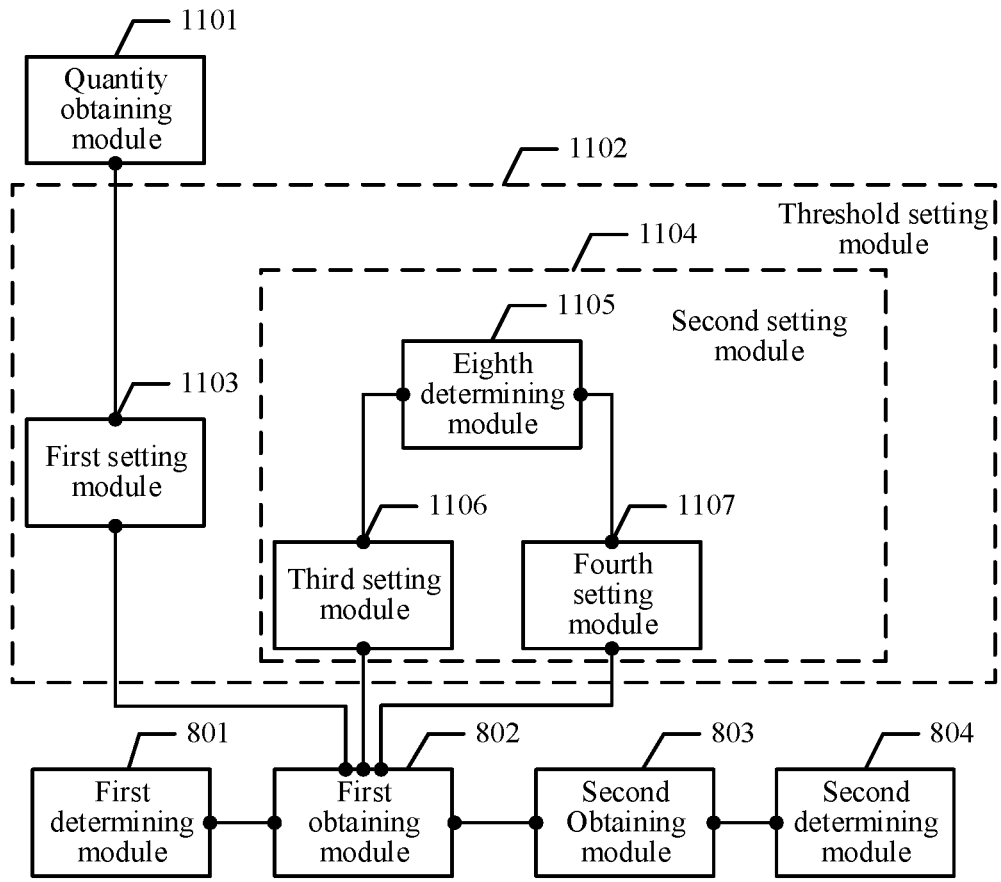
FIG. 11 is another schematic structural diagram of a program module of an apparatus for determining division of a coding unit according to an embodiment of this application.

FIG. 11 is a schematic structural diagram of a program module of an apparatus for determining division of a coding unit according to an embodiment of this application. The apparatus includes the first determining module 801, the first obtaining module 802, the second obtaining module 803, and the second determining module 804 in the embodiment shown in FIG. 8, and content described in one embodiment is similar to the content described in the embodiment shown in FIG. 8. This is not described herein again.

The first obtaining module 802 is specifically configured to: calculate gradients of smallest coding units included in the current coding unit; and use a sum of the gradients of the smallest coding units as the gradient of the current coding unit.

In one embodiment of this application, the apparatus for determining division of a coding unit further includes:

a quantity obtaining module 1101, configured to obtain a second quantity of adjacent blocks of the current coding unit, sizes of the adjacent blocks being the same as the size of the current coding unit; and a threshold setting module 1102, configured to set the first threshold according to the second quantity.

The threshold setting module 1102 includes a first setting module 1103 and a second setting module 1104.

The first setting module 1103 is configured to set the first threshold to a preset value when the second quantity is less than a sixth threshold.

The second setting module 1104 is configured to: when the second quantity is equal to the sixth threshold, set the first threshold according to the size of the coding unit to which the adjacent blocks belong and the size of the current coding unit.

The second setting module 1104 includes an eighth determining module 1105, a third setting module 1106, and a fourth setting module 1107.

The eighth determining module 1105 is configured to determine whether a target adjacent block belonging to a coding unit whose size is greater than or equal to the size of the current coding unit exists in the adjacent blocks.

The third setting module 1106 is configured to: when the target adjacent block exists, set the first threshold according to a gradient of the coding unit to which the target adjacent block belongs.

The fourth setting module 1107 is configured to set the first threshold to zero when the target adjacent block does not exist.

It may be understood that, for content related to the foregoing modules, specifically refer to the embodiment shown in FIG. 5. This is not described herein again.

In one embodiment of this application, whether the current coding unit needs to be divided is determined with reference to the gradient of the current coding unit and the gradients of the sub-coding units of the current coding unit. This not only can reduce an operation load and an operation complexity degree of the coding unit division, but also fully considers an impact of a difference of the gradients of the sub-coding units on a structure of the coding unit and on selection of an intra-frame prediction mode, so that coding can be better implemented, thereby further reducing bit rates. In addition, by setting the first threshold based on the adjacent block of the current coding unit, to determine, according to the first threshold and the gradient of the current coding unit, whether the current coding unit needs to be divided, the accuracy of the determining can be effectively improved, so that the current coding unit can be divided more properly.

Figure 12:
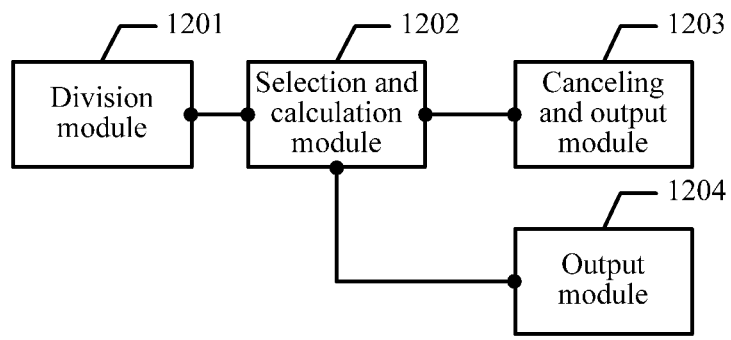
FIG. 12 is a schematic structural diagram of an additional program module according to an embodiment of this application.

FIG. 12 is a schematic structural diagram of an additional program module according to an embodiment of this application. The additional program module is configured to divide a current coding unit when it is determined that the current coding unit needs to be divided. The additional program module includes:

a division module 1201, configured to divide the current coding unit into a plurality of sub-coding units;

a selection and calculation module 1202, configured to: respectively select an optimal intra-frame prediction mode for the plurality of sub-coding units; and calculate coding cost values of the plurality of sub-coding units;

a canceling and output module 1203, configured to: cancel division of the current coding unit when a sum of the coding cost values of the plurality of sub-coding units is greater than or equal to a coding cost value of the current coding unit; and output the optimal intra-frame prediction mode of the current coding unit; and an output module 1204, configured to output the coding cost values of the plurality of sub-coding units and the selected optimal intra-frame prediction modes when the sum of the coding cost values of the plurality of sub-coding units is less than the coding cost value of the current coding unit.

In one embodiment of this application, when it is determined that the current coding unit needs to be divided, a sum of coding cost values of sub-coding units of a current coding unit obtained after the division is compared with the coding cost value of the current coding unit, and the sum is output in a manner in which a coding cost value is the minimum, so that the coding unit can be more properly divided, thereby reducing coding costs.

An embodiment of this application further provides a computing device, including a memory, a processor, and a computer program stored in the memory and run on the processor, the computer program, when being executed by the processor, implementing the steps of the method for determining division of a coding unit in any one of the embodiments shown in FIG. 1 to FIG. 5 or FIG. 7.

An embodiment of this application further provides a readable storage medium storing a computer program, the computer program, when being executed by a processor, implementing the steps of the method for determining division of a coding unit in any one of the embodiments shown in FIG. 1 to FIG. 5 or FIG. 7.

Figure 13:
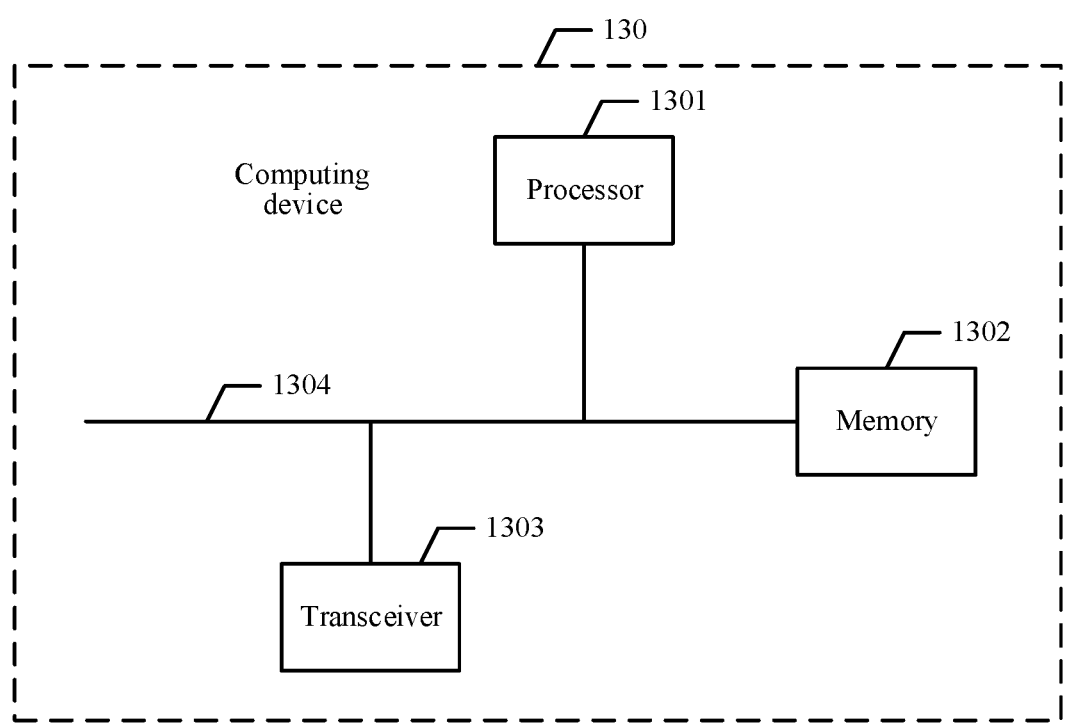
FIG. 13 is a schematic structural diagram of a computing device according to an embodiment of this application.

It may be understood that, in one embodiment of this application, the foregoing apparatus for determining division of a coding unit is a computing device. The computing device may be specifically a server. To better understand the technical solution in one embodiment of this application, refer to FIG. 13. FIG. 13 is a schematic structural diagram of a computing device 130 according to an embodiment of this application. The computing device 130 includes a processor 1301, a memory 1302, and a transceiver 1303. The memory 1302 may include a read-only memory (ROM) and a random access memory (RAM), and provides an operation instruction and data to the processor 1301. A part of the memory 1302 may further include a non-volatile RAM (NVRAM).

In some implementations, the memory 1302 stores the following element: an executable module, or a data structure, or a subset thereof, or an extension set thereof.

In one embodiment of this application, the following process is performed by invoking the operation instruction stored in the memory 1302 (where the operation instruction may be stored in an operating system): after an optimal intra-frame prediction mode of a current coding unit is determined, it is determined whether a size of the current coding unit is greater than a size of a smallest coding unit; a gradient of the current coding unit is obtained when the size of the current coding unit is greater than the size of the smallest coding unit; gradients of sub-coding units that are included in the current coding unit are obtained when the gradient of the current coding unit is less than a first threshold; and it is determined, according to the gradients of the sub-coding units, whether to divide the current coding unit.

Compared with a manner in the existing technology in which all coding units are divided, according to the computing device provided in one embodiment of this application, whether to further divide a current coding unit whose size is greater than a size of a smallest coding unit needs to be determined according to a gradient of the current coding unit and gradients of sub-coding units included in the current coding unit, so that a coding unit that does not need to be divided can be determined, thereby reducing an operation amount caused by the coding unit division and reducing an operation complexity degree.

The processor 1301 controls an operation of the computing device 130, and the processor 1301 may also be referred to as a central processing unit (CPU). The memory 1302 may include a ROM and a RAM, and provides an instruction and data to the processor 1301. A part of the memory 1302 may further include an NVRAM. During specific application, all components of the computing device 130 are coupled by using a bus system 1304, and besides a data bus, the bus system 1304 may further include a power source bus, a control bus, a state signal bus, and the like. However, for clear description, various types of buses in the figure are marked as the bus system 1304.

The method disclosed in the foregoing embodiments of this application may be applied to the processor 1301, or may be implemented by the processor 1301. The processor 1301 may be an integrated circuit chip having a signal processing capability. In an implementation process, steps in the foregoing methods can be implemented by using a hardware integrated logical circuit in the processor 1301, or by using instructions in a form of software. The processor 1301 may be a general-purpose processor, a digital signal processor (DSP), an application-specific integrated circuit (ASIC), a field programmable gate array (FPGA), or another programmable logic device, discrete gate or transistor logic device, or discrete hardware assembly. The processor 1301 may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and a software module in the decoding processor. The software module may be located in a mature storage medium in the art, such as a RAM, a flash memory, a ROM, a programmable ROM, an electrically erasable programmable memory, or a register. The storage medium is located in the memory 1302, and the processor 1301 reads information in the memory 1302 and completes the steps in the foregoing methods in combination with hardware of the processor.

For understanding of the computing device 130, refer to the descriptions of the embodiments in FIG. 1 to FIG. 7. This is not described herein again.

In the several embodiments provided in this application, it should be understood that the disclosed apparatus and method may be implemented in other manners. For example, the described apparatus embodiments are merely examples. For example, division of the modules is merely logical function division and may be other division manners during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

In addition, functional modules in the embodiments of in this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the existing technology, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of this application. The foregoing storage medium includes any medium that can store program code, such as a USB flash drive, a removable hard disk, a ROM, a RAM, a magnetic disk, or an optical disc.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all belong to preferred embodiments, and the actions and modules are not necessarily required by this application.

In the foregoing embodiments, the description of each embodiment has respective focuses. For a part that is not described in detail in an embodiment, reference may be made to related descriptions in other embodiments.

Detailed above are the method and apparatus for determining division of a coding unit, the computing device, and the readable storage medium provided in this application. Persons skilled in the art may make modifications to the specific implementations and application scopes according to the ideas of the embodiments of this application. To conclude, the content of the specification should not be construed as a limitation to this application.

What is claimed is:

1. A method for determining division of a coding unit, comprising:
    determining, by a computing device, whether a size of a current coding unit is greater than a size of a smallest coding unit;
    obtaining, by the computing device, a gradient of the current coding unit when the size of the current coding unit is greater than the size of the smallest coding unit;
    determining, by the computing device, to divide the current coding unit when the gradient of the current coding unit is not less than a first threshold;
    when the gradient of the current coding unit is less than the first threshold, obtaining, by the computing device, gradients of sub-coding units comprised in the current coding unit; and determining, by the computing device according to the gradients of the sub-coding units, whether to divide the current coding unit, by:
  determining whether a sum of the gradients of the sub-coding units is greater than a second threshold, the first threshold being greater than the second threshold;
  when the sum of the gradients of the sub-coding units is not greater than the second threshold, determining not to divide the current coding unit; and
  when the sum of the gradients of the sub-coding units is greater than the second threshold, determining whether to divide the current coding unit according to the gradients of the sub-coding units by one or both of:
    determining a first quantity of sub-coding units whose gradients are less than or equal to a third threshold in the sub-coding units; when the first quantity is greater than or equal to a fourth threshold, determining, by the computing device, to divide the current coding unit; and when the first quantity is less than the fourth threshold, determining, by the computing device, not to divide the current coding unit; and
    determining whether a ratio of a largest gradient to a smallest non-zero gradient in the gradients of the sub-coding units is greater than or equal to a fifth threshold; when the ratio is greater than or equal to the fifth threshold, determining, by the computing device, to divide the current coding unit; and when the ratio is less than the fifth threshold, determining, by the computing device, not to divide the current coding unit.

2. The method according to claim 1, wherein the obtaining, by the computing device, a gradient of the current coding unit comprises:
  calculating, by the computing device, gradients of smallest coding units comprised in the current coding unit, and using a sum of the gradients of the smallest coding units as the gradient of the current coding unit.

3. The method according to claim 1, further comprising:
  obtaining, by the computing device, a second quantity of adjacent blocks of the current coding unit, sizes of the adjacent blocks being the same as the size of the current coding unit; and
  setting, by the computing device, the first threshold according to the second quantity.

4. The method according to claim 3, wherein the setting, by the computing device, the first threshold according to the second quantity comprises:
  setting, by the computing device, the first threshold to a preset value when the second quantity is less than a sixth threshold; and
  when the second quantity is equal to the sixth threshold, setting, by the computing device, the first threshold according to a size of a coding unit to which one of the adjacent blocks belong and the size of the current coding unit.

5. The method according to claim 4, wherein the setting, by the computing device, the first threshold according to the size of the coding unit to which one of the adjacent blocks belong and the size of the current coding unit comprises:
  determining, by the computing device, whether a target adjacent block belonging to a coding unit whose size is greater than or equal to the size of the current coding unit exists in the adjacent blocks;
  when the target adjacent block exists, setting, by the computing device, the first threshold according to a gradient of the coding unit to which the target adjacent block belongs; and
  setting, by the computing device, the first threshold to zero when the target adjacent block does not exist.

6. An apparatus for determining division of a coding unit, comprising: a memory; and a processor coupled to the memory and configured to:
  determine whether a size of a current coding unit is greater than a size of a smallest coding unit;
  obtain a gradient of the current coding unit when the size of the current coding unit is greater than the size of the smallest coding unit;
  determine to divide the current coding unit when the gradient of the current coding unit is not less than a first threshold; and
  when the gradient of the current coding unit is less than the first threshold, obtain gradients of sub-coding units comprised in the current coding unit; and
  determine, according to the gradients of the sub-coding units, whether to divide the current coding unit, by:
    determining whether a sum of the gradients of the sub-coding units is greater than a second threshold, the first threshold being greater than the second threshold;
    when the sum of the gradients of the sub-coding units is not greater than the second threshold, determining not to divide the current coding unit; and
    when the sum of the gradients of the sub-coding units is greater than the second threshold, determining whether to divide the current coding unit according to the gradients of the sub-coding units by one or both of:
      determining a first quantity of sub-coding units whose gradients are less than or equal to a third threshold in the sub-coding units; when the first quantity is greater than or equal to a fourth threshold, determining, by the computing device, to divide the current coding unit; and when the first quantity is less than the fourth threshold, determining, by the computing device, not to divide the current coding unit; and
      determining whether a ratio of a largest gradient to a smallest non-zero gradient in the gradients of the sub-coding units is greater than or equal to a fifth threshold; when the ratio is greater than or equal to the fifth threshold, determining, by the computing device, to divide the current coding unit; and when the ratio is less than the fifth threshold, determining, by the computing device, not to divide the current coding unit.

7. The apparatus according to claim 6, wherein the processor is specifically configured to:
  calculate gradients of smallest coding units comprised in the current coding unit; and
  use a sum of the gradients of the smallest coding units as the gradient of the current coding unit.

8. The apparatus according to claim 6, wherein the processor is further configured to:
  obtain a second quantity of adjacent blocks of the current coding unit, sizes of the adjacent blocks being the same as the size of the current coding unit; and
  set the first threshold according to the second quantity.

9. The apparatus according to claim 8, wherein the processor is further configured to:
  set the first threshold to a preset value when the second quantity is less than a sixth threshold; and when the second quantity is equal to the sixth threshold, set the first threshold according to the size of the coding unit to which one of the adjacent blocks belong and the size of the current coding unit.

10. The apparatus according to claim 9, wherein the processor is further configured to:
  determine whether a target adjacent block belonging to a coding unit whose size is greater than or equal to the size of the current coding unit exists in the adjacent blocks;
  when the target adjacent block exists, set the first threshold according to a gradient of the coding unit to which the target adjacent block belongs; and
  set the first threshold to zero when the target adjacent block does not exist.

11. A non-transitory computer-readable storage medium storing computer program instructions executable by at least one processor to perform:
  determining whether a size of a current coding unit is greater than a size of a smallest coding unit;
  obtaining a gradient of the current coding unit when the size of the current coding unit is greater than the size of the smallest coding unit;
  determining to divide the current coding unit when the gradient of the current coding unit is not less than a first threshold;
  when the gradient of the current coding unit is less than the first threshold, obtaining gradients of sub-coding units comprised in the current coding unit; and
  determining, according to the gradients of the sub-coding units, whether to divide the current coding unit, by:
    determining whether a sum of the gradients of the sub-coding units is greater than a second threshold, the first threshold being greater than the second threshold;
    when the sum of the gradients of the sub-coding units is not greater than the second threshold, determining not to divide the current coding unit; and
    when the sum of the gradients of the sub-coding units is greater than the second threshold, determining whether to divide the current coding unit according to the gradients of the sub-coding units by one or both of:
      determining a first quantity of sub-coding units whose gradients are less than or equal to a third threshold in the sub-coding units; when the first quantity is greater than or equal to a fourth threshold, determining, by the computing device, to divide the current coding unit; and when the first quantity is less than the fourth threshold, determining, by the computing device, not to divide the current coding unit; and
      determining whether a ratio of a largest gradient to a smallest non-zero gradient in the gradients of the sub-coding units is greater than or equal to a fifth threshold; when the ratio is greater than or equal to the fifth threshold, determining, by the computing device, to divide the current coding unit; and when the ratio is less than the fifth threshold, determining, by the computing device, not to divide the current coding unit.

12. The storage medium according to claim 11, wherein the obtaining a gradient of the current coding unit comprises:
  calculating gradients of smallest coding units comprised in the current coding unit, and using a sum of the gradients of the smallest coding units as the gradient of the current coding unit.

13. The storage medium according to claim 11, wherein the computer program instructions further cause the at least one processor to perform:
  obtaining a second quantity of adjacent blocks of the current coding unit, sizes of the adjacent blocks being the same as the size of the current coding unit; and
  setting the first threshold according to the second quantity.

14. The storage medium according to claim 13, wherein the setting the first threshold according to the second quantity comprises:
  setting the first threshold to a preset value when the second quantity is less than a sixth threshold; and
  when the second quantity is equal to the sixth threshold, setting the first threshold according to a size of a coding unit to which one of the adjacent blocks belong and the size of the current coding unit.

15. The storage medium according to claim 14, wherein the setting the first threshold according to the size of the coding unit to which one of the adjacent blocks belong and the size of the current coding unit comprises:
  determining whether a target adjacent block belonging to a coding unit whose size is greater than or equal to the size of the current coding unit exists in the adjacent blocks;
  when the target adjacent block exists, setting the first threshold according to a gradient of the coding unit to which the target adjacent block belongs; and
  setting the first threshold to zero when the target adjacent block does not exist.

* * * * *